US010324899B2

(12) United States Patent
Sorvari et al.

(10) Patent No.: US 10,324,899 B2
(45) Date of Patent: Jun. 18, 2019

(54) METHODS FOR CHARACTERIZING CONTENT ITEM GROUPS

(75) Inventors: Antti Sorvari, Itäsalmi (FI);
Jukka-Pekka Salmenkaita, Fleet (GB);
Joonas Paalasmaa, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 283 days.

(21) Appl. No.: 11/268,695

(22) Filed: Nov. 7, 2005

(65) Prior Publication Data
US 2007/0112852 A1 May 17, 2007

(51) Int. Cl.
*G06F 16/28* (2019.01)
*G06F 16/16* (2019.01)
*G06F 16/35* (2019.01)

(52) U.S. Cl.
CPC .......... *G06F 16/168* (2019.01); *G06F 16/285* (2019.01); *G06F 16/35* (2019.01); *G06F 16/355* (2019.01)

(58) Field of Classification Search
CPC .. G06F 3/0481; G06F 3/0484; G06F 3/04842; G06F 17/2785; G06F 17/30247; G06F 17/30056; G06F 17/30256; G06F 17/30126; G06F 16/285; G06F 16/35; G06F 16/355; G06F 16/24578; G06F 16/583; H04N 21/44204; H04N 21/2665
See application file for complete search history.

(56) References Cited

U.S. PATENT DOCUMENTS

| 5,708,767 | A | * | 1/1998 | Yeo ........................ G11B 27/28 345/440 |
| 5,812,134 | A | * | 9/1998 | Pooser et al. ................. 715/848 |
| 5,818,439 | A | * | 10/1998 | Nagasaka ......... G06F 17/30793 725/87 |
| 5,821,945 | A | * | 10/1998 | Yeo et al. ..................... 345/440 |
| 5,917,488 | A | * | 6/1999 | Anderson ............... G06F 16/54 715/838 |
| 6,055,543 | A | * | 4/2000 | Christensen et al. |
| 6,105,036 | A | * | 8/2000 | Henckel |
| 6,133,909 | A | * | 10/2000 | Schein et al. ................ 715/721 |
| 6,236,987 | B1 | * | 5/2001 | Horowitz et al. ............... 707/3 |
| 6,240,423 | B1 | * | 5/2001 | Hirata ........................ 707/104.1 |
| 6,260,721 | B1 | * | 7/2001 | Ohmi et al. .................. 215/256 |

(Continued)

FOREIGN PATENT DOCUMENTS

| EP | 1 566 752 A2 | 8/2005 |
| WO | WO-2004/079597 | 9/2004 |

OTHER PUBLICATIONS

Office Action for Canadian Patent Application No. 2,628,946, dated May 31, 2011.

(Continued)

*Primary Examiner* — Tadesse Hailu
(74) *Attorney, Agent, or Firm* — Alston & Bird LLP

(57) ABSTRACT

The selection and presentation of representative image content items and textual content. In one aspect, the present invention relates to the selection of one or more image/video content items that are likely to represent well a group of image/video content items. In another aspect, the present invention relates to presentation of the selected content items are discussed. In yet another aspect, the present invention relates to the composition of textual characterizations of content.

17 Claims, 6 Drawing Sheets

(56) References Cited

U.S. PATENT DOCUMENTS

| | | | |
|---|---|---|---|
| 6,518,999 B1* | 2/2003 | Miyamoto | H04N 1/215 348/220.1 |
| 6,542,869 B1* | 4/2003 | Foote | G10H 1/00 704/500 |
| 6,714,936 B1* | 3/2004 | Nevin, III | |
| 6,760,721 B1* | 7/2004 | Chasen et al. | |
| 6,868,525 B1* | 3/2005 | Szabo | 715/738 |
| 6,928,233 B1* | 8/2005 | Walker | H04N 19/503 386/241 |
| 6,941,321 B2* | 9/2005 | Schuetze et al. | 707/103 R |
| 6,948,133 B2* | 9/2005 | Haley | 715/780 |
| 7,047,500 B2* | 5/2006 | Roelofs | 715/779 |
| 7,149,755 B2* | 12/2006 | Obrador | 707/104.1 |
| 7,185,050 B2* | 2/2007 | Eld et al. | 709/203 |
| 8,549,434 B2* | 10/2013 | Ouzts | G06F 3/0481 715/838 |
| 2002/0052895 A1* | 5/2002 | Keating | 707/514 |
| 2002/0180803 A1* | 12/2002 | Kaplan et al. | 345/810 |
| 2002/0184095 A1 | 12/2002 | Scullard et al. | |
| 2003/0069892 A1* | 4/2003 | Hind et al. | 707/103 X |
| 2003/0076322 A1 | 4/2003 | Ourts et al. | |
| 2003/0120507 A1* | 6/2003 | Aasman et al. | 705/1 |
| 2004/0019608 A1 | 1/2004 | Obrador | |
| 2004/0024758 A1* | 2/2004 | Iwasaki | G06F 16/532 |
| 2004/0078383 A1* | 4/2004 | Mercer et al. | 707/102 |
| 2004/0125124 A1* | 7/2004 | Kim et al. | 345/716 |
| 2004/0254911 A1* | 12/2004 | Grasso et al. | 707/1 |
| 2005/0108319 A1* | 5/2005 | Kohno et al. | 709/201 |
| 2005/0111737 A1* | 5/2005 | Das et al. | 382/190 |
| 2005/0165766 A1* | 7/2005 | Szabo | 707/3 |
| 2006/0015492 A1* | 1/2006 | Keating | G06F 16/583 |
| 2006/0015494 A1* | 1/2006 | Keating et al. | 707/6 |
| 2006/0020597 A1* | 1/2006 | Keating | G06F 17/3025 |
| 2006/0023585 A1* | 2/2006 | Takahashi | 369/47.1 |
| 2006/0036568 A1* | 2/2006 | Moore et al. | 707/1 |
| 2006/0206495 A1* | 9/2006 | Van Gageldonk et al. | 707/100 |
| 2006/0259867 A1* | 11/2006 | Watson et al. | 715/760 |
| 2007/0033224 A1* | 2/2007 | Allen et al. | 707/104.1 |
| 2007/0088678 A1* | 4/2007 | Farago et al. | 707/3 |
| 2007/0088692 A1* | 4/2007 | Dean et al. | 707/5 |
| 2007/0118794 A1* | 5/2007 | Hollander et al. | 715/512 |
| 2007/0124325 A1* | 5/2007 | Moore | G06F 16/58 |
| 2007/0133947 A1* | 6/2007 | Armitage | G06F 17/30256 386/224 |
| 2007/0185876 A1* | 8/2007 | Mendis et al. | 707/10 |
| 2008/0114756 A1* | 5/2008 | Konig et al. | 707/5 |

OTHER PUBLICATIONS

Office Action for Canadian Application No. 2,628,946; dated Nov. 26, 2012.
Supplementary European Search Report for Application No. EP 06 82 0853 dated Mar. 24, 2011.
Office Action for Application No. EP 06 820 853.7 dated Dec. 22, 2011.
Written Opinion for International Application No. PCT/IB2006/003120 dated Feb. 7, 2007.
Summons to Attend Oral Proceedings for European Application No. EP 06 820 853.7 dated Nov. 2, 2015, 7 pages.
Result of Consulation for European Application No. EP 06 820 853.7 dated Mar. 17, 2016, 3 pages.
Minutes of the Oral Proceedings for European Application No. EP 06 820 853.7 dated May 18, 2016, 3 pages.
Decision to Refute European Application No. EP 06 820 853.7 dated May 20, 2016, 21 pages.

* cited by examiner

-- Prior Art --

METHODS FOR CHARACTERIZING CONTENT ITEM GROUPS

FIELD OF THE INVENTION

The present invention relates generally to the management of visual content. More particularly, the present invention relates to the management of visual content in small screen devices such as mobile phones.

BACKGROUND OF THE INVENTION

Portable electronic devices have become ubiquitous in modern society, providing a wide array of functions and uses. While consumers have widely adopted mobile telephones, personal digital assistants, portable music players, and other such devices, the current direction of technology is towards a convergence of function into a single device. Regardless of the type of device, the nearly continually increasing storage capacity for such devices enables users to store very large amounts of media content such as visual and audio content (e.g., images, music, and videos) to their mobile phones or other small screen devices. However, the sheer amount of content able to be stored often can exceed the ability of the device and user to efficiently locate, access, and use the content.

Conventional devices have attempted to provide some organization of visual content. The content can be organized and presented to the user with a hierarchical or non-hierarchical user interface (UI). However, to reduce the number of content items presented to the user in any given user interface view, it is often beneficial to use a hierarchical presentation with two or more levels. Conventional devices often utilize a hierarchical design, whereby items are organized in nodes as part of a tree. Such a hierarchical data structure comprises a root node and may have additional nodes (child nodes) stemming therefrom. All of the children of the same node are called siblings. A node without any children is referred to as a leaf, and a node having children is referred to as a non-leaf node. In some prior art devices, the visual content is contained in the node. Thus, nodes are themselves organizable under other nodes, either alone or with other nodes or media content.

Whenever content is presented hierarchically it is necessary to characterize each non-leaf node in the hierarchy so that the user can understand which items can be found under each node. This characterization is typically done visually and can be done, e.g. using the thumbnail of one file that belongs under a specific node in the hierarchical presentation. Alternatively, a node in the hierarchy can be characterized by a textual explanation, e.g. "April 2005" for a node containing images and videos captured in April 2005, or a combination of visual and textual representation.

However, conventional devices and systems have at least one significant problem: whenever a group of files is characterized in a hierarchical presentation, it is difficult to select the best possible representation of the group (e.g. a thumbnail) that would allow the user to understand/remember what content is actually contained inside the group.

A first group of conventional systems utilize a visual image of the visual content. In one such system, a single thumbnail represents a group of files. Typically, the thumbnail of the first (oldest) file in the group is shown automatically. In some cases, (e.g. in Adobe Photoshop Album) the user is also able to select the presented thumbnail manually. Another system uses more than one thumbnail to represent a group of files. Typically, the thumbnails of the first files in the group is shown. FIGS. 1(a) through 1(c) represent examples of conventional designs.

A second group of conventional systems utilize textual representation, such as a folder name or metadata describing a node in metadata based hierarchy is also used by some prior art systems.

A third group of conventional systems use a combination of textual and visual representation. For example, FIGS. 2(a) and 2(b) illustrates a screenshot taken from the Nokia Albums®2.0 SERIES 60 application. FIG. 2(a) shows a screen where a user selects a textual representation (i.e. month and year) and then in FIG. 2(b) the application shows groups of files that each represent one day when images or videos were captured. The month groups are characterized textually, and the day groups are characterized with a combination of textual and visual thumbnail presentations. In this case, the thumbnail is automatically selected to be the oldest file in each day group.

In addition, some conventional systems utilize more advanced visual displays representing the visual content. Video thumbnails are typically created by selecting the first or another frame from the beginning of a video. Microsoft Windows Xp® also supports dynamic video thumbnails so that, if the user focuses a video thumbnail, the video starts to play in thumbnail size. In addition, some DVD players are able to show dynamic small size video "thumbnails" that are actually small boxes that play a scene of a movie. Several scenes can be played simultaneously.

Although there are numerous ways to show a representative file on a graphical user interface, there remains a need for a method and device allowing for the selection of the visual and/or textual characterization for specific visual content in a hierarchical presentation in order to provide a user with sufficient information regarding the content within the node.

SUMMARY OF THE INVENTION

The present invention provides new methods for better selecting the audio, visual and/or textual characterization for a group of image, audio and video content items or files in a hierarchical presentation. In addition, the present invention relates to new methods for composing dynamic presentations of groups of content items or files instead of a showing e.g. a static representation of one or more thumbnails. These methods enable the user to get a better understanding of the content items or files contained under the nodes of a hierarchical presentation. Thus, the user is able to perform more effective browsing and the user is able to find desired content items or files more quickly than in previous systems.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention relates to the selection and presentation of representative image files and textual content. In one aspect, the present invention relates to the selection of one or more image/audio/video files or content items that are likely to represent well a group of image/audio/video files. In another aspect the present invention relates to the presentation of the selected files. In another aspect the present invention relates to the composition of textual characterizations of content.

The present invention relates to systems and methods for the selection of a representative files from visual content files. It should be noted that, although the term "file" is used herein, content can be stored in a manner (such as data in a database) such that each content item is not stored in a separate file. Therefore, it should be understood that the present invention is intended to cover general content items and is not strictly limited to the use of multiple files. Files that are likely to represent well a whole group of files can be selected using one or more criteria described below. In one exemplary embodiment, representative files are selected by the automatic recognition of favorite files. "Favoriteness" can be measured in various ways known in the art, such as by recording user actions (e.g. viewing on the device or on a remote device such as a television, sending, sharing, blogging, publishing, printing, storing and annotating) that either increase or decrease file favoriteness. For example, PCT Patent Application No. PCT/FI03/00177 entitled "A method and a device for frequency counting" filed in March 2003 teaches an algorithm for calculating a favoriteness score. In general, any algorithm may be used in which favoriteness is calculated. In one embodiment, favoriteness is determined by calculating the number of logged actions and providing more weight to recent actions. In another exemplary embodiment, manual ratings provided by the user (or even some other users) are used to select the representative files.

Figure 1A:
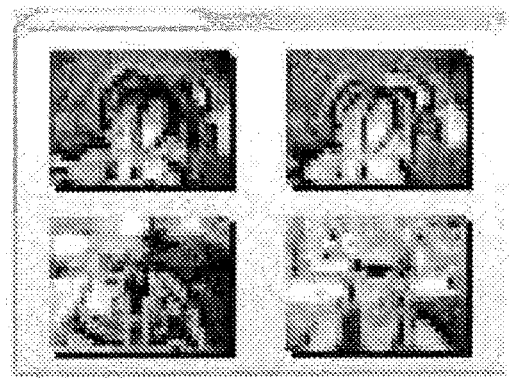
FIG. 1(a) is a representation of a conventional folder having video content represented by a visual thumbnail of four frames of one of the video files.
Figure 1B:
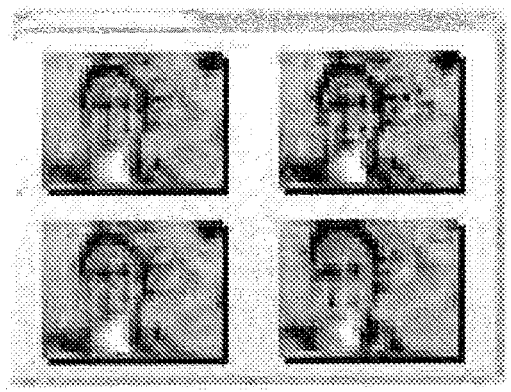
FIG. 1(b) is a representation of a conventional folder having image content represented by a visual thumbnail of four of the images.
Figure 1C:
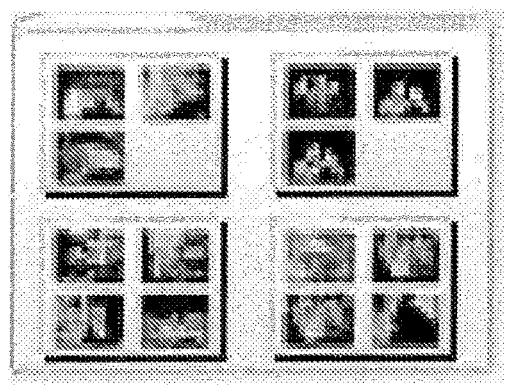
FIG. 1(c) is a representation of a conventional folder having subfolders containing images and videos.
Figure 1D:
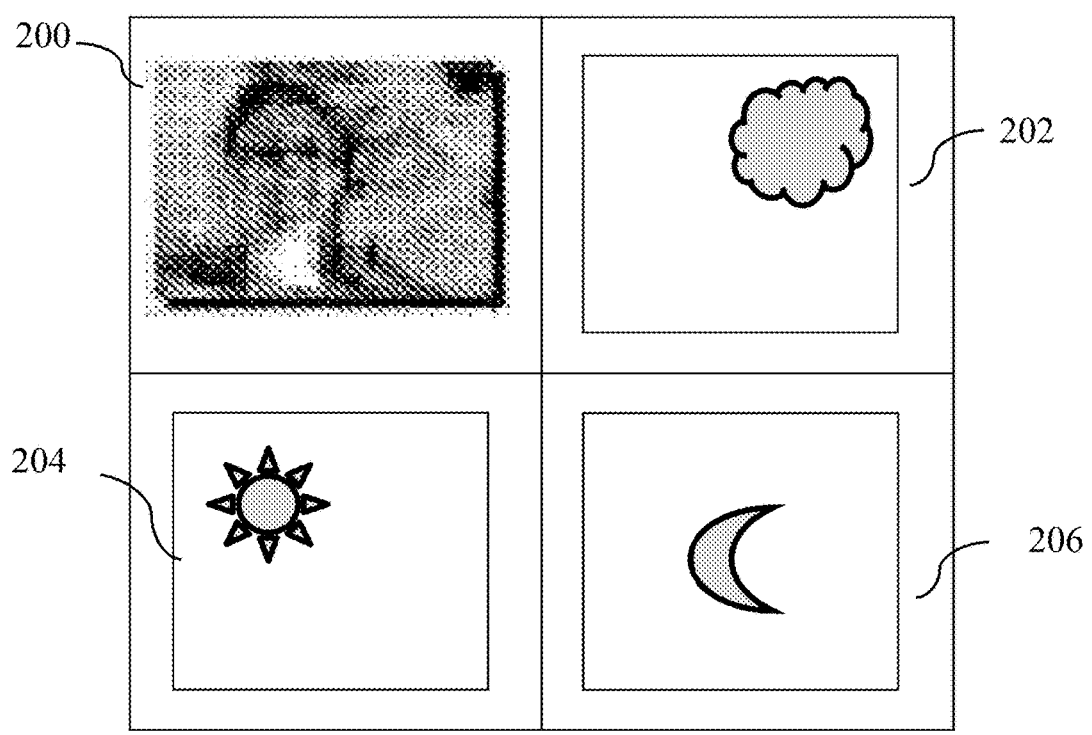
FIG. 1(d) is a representation according to an example embodiment.
Figures 2A, 2B:
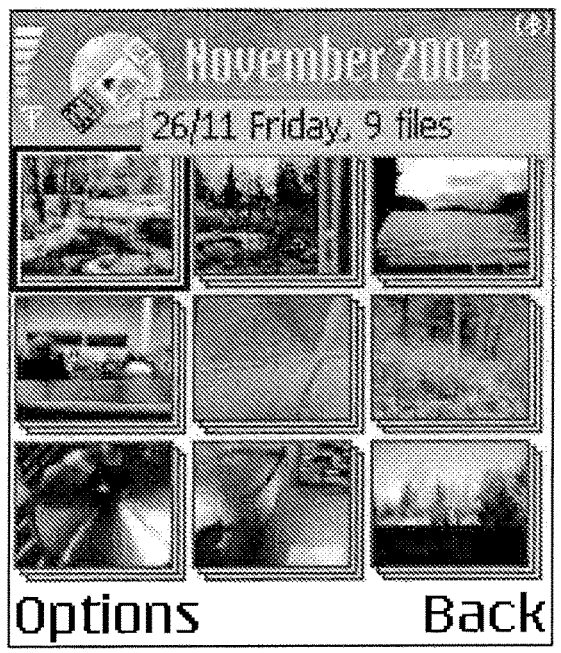
FIG. 2(a) is a screenshot taken from Nokia Album 2.0 Series 60 application showing thumbnail images within a folder.
FIG. 2(b) is a screenshot taken from Nokia Album 2.0 Series 60 application showing a time view where a textual representation (i.e., month and year) is provide for files within a node.

In another exemplary embodiment, a representative file is selected based on content analysis. In one exemplary embodiment, the content analysis is based on file similarity. The use of file similarity in selecting a representative file is based on the premise that a set of similar files inside a group should be considered more important than any single file that it dissimilar with other files. However, in one embodiment, for each set of similar files only one or a few files should be selected to avoid presentations shown in the second screen shot in FIG. 1(b) where four practically identical images are represented in the folder characterization although the folder actually contains other dissimilar images. Thus, in one exemplary embodiment, file similarity is used to determine the most representative "sets" of similar files. For example, instead of showing the four very similar thumbnails in FIG. 1(b), in one embodiment only one thumbnail 200 of the similar files in a node are shown along with thumbnails 202, 204, and 206 of other dissimilar files in the folder, as shown in FIG. 1(d).

In another exemplary embodiment, face detection is used to determine the representative file. Present devices such as mobile phones have enough processing power to run face detection algorithms. Therefore, it is possible to detect the occurrence of faces in image and video files. In one embodiment, face detection can be used as one file similarity criteria. In addition, in one embodiment, images/videos that contain a small number of big faces, compared to image/video resolution, can be preferred over large number of small faces. This is especially useful if a small size thumbnail presentation is used, since big faces are easier to recognize from small thumbnails.

In another exemplary embodiment, a representative file can be selected using face recognition. In addition to face detection discussed above, face recognition can be used in detecting images/videos containing the same faces. In one embodiment, face recognition can be utilized in the same way as file similarity criteria discussed above.

In another exemplary embodiment, visual content similarity/dissimilarity can be determined based on technical capturing parameters that are available e.g. in EXIF fields in images. In one embodiment, such technical parameters could include flash usage, exposure time, aperture, zoom settings, sequence mode information, and combinations thereof. These values can be used to determine e.g. whether any two images were captured in same lighting conditions. Although by analyzing technical capturing parameters, it is not possible to always determine how similar any given two images are, two very similar images are very likely to have very similar if not identical technical capturing parameters. Although the analysis of technical parameters may not provide as accurate similarity results as content based techniques, the advantage of technical parameter analysis is that it is faster and easier to perform. If the images have been captured using a sequence mode (i.e. a continuous shooting mode), this information can be easily extracted from the EXIF data, and the file similarity can be determined without content analysis.

In one exemplary embodiment, a group of files can be clustered using file metadata, and representative files can be selected from different clusters. For example, in one embodiment, in a location-based hierarchy, the files of a certain node can be clustered based on date/time criterion. A simple way of performing the clustering is to cluster content captured in different days to different clusters. The representative files would then be selected from the different day clusters based on, e.g., favoriteness and/or other criteria described above.

In another embodiment, the representative file selection can be made context-aware. Context-aware means that files are selected based on the current context and previously recorded (context) metadata associated with the files. For example, the information on nearby Bluetooth®/WLAN/UWB devices will be recorded when an image or video is captured and this information is stored as file metadata. In addition and in one embodiment, a device in accordance with the principles of the present invention is capable of detecting which Bluetooth®/WLAN/UWB devices are currently nearby when the content is browsed. The metadata and the information of currently nearby devices could be utilized so that node representatives are selected by putting more weight to files that contain metadata of currently nearby devices. This would indicate that these files were captured when the currently nearby devices were nearby. This would mean that if a user is showing files to a user's friend or friends, the thumbnails of the friend(s) would be more likely to appear than if the friend(s) were not nearby. Similarly using a location criteria, when visiting a summer cottage, the user would be more likely to see thumbnails of images and videos that were captured near the summer cottage. This would provide an easy manner to find content captured during e.g., the previous visit. In another exemplary embodiment, the newest or oldest files are selected. In still another exemplary embodiment, if a node contains images and videos, both images and videos (not just e.g. images) are selected.

Another aspect of the present invention relates to the representation on a graphical display of the selected representative image. The above representative selection techniques can be combined with any of the presentation techniques described below or known in the art.

In one exemplary embodiment, one or more static thumbnails is displayed. If more than one thumbnail, e.g., as in an arrangement as shown in FIG. 1, is shown, then the placement of the thumbnails can be done so that thumbnails are ordered according to the weight that they received based on file selection criteria such as favoriteness, freshness or suitability to the current context. Video thumbnails can be generated e.g., by presenting the first video frame as a thumbnail or using other techniques known in the art.

In another exemplary embodiment, a "slideshow" presentation of selected files is used. Instead of showing a static thumbnail presentation, a dynamic presentation is used where several thumbnails are shown by changing the presented thumbnail after a certain time period or after a suitable user action such as a key press. The slideshow presentation can be used to show all of the files that belong to a hierarchical node or only files that have been selected using criteria described above.

In one embodiment using the slideshow presentation, the presentation order and presentation time for each thumbnail can be based on the same kind of criteria as the file selection criteria described above. The presentation order and time can be varied if only selected files are presented but also if all the files are presented. For example, in one embodiment, the most favorite files can be presented first or most suitable files to the present context can be represented first. In another embodiment a set of similar files (e.g., images captured using sequence mode) are shown but the showing time for each file is shortened.

Another aspect of the present invention relates to textual characterizations and representation of the visual content. The following describes ways of characterizing image and video file groups textually, possibly in combination with a visual characterization.

In one exemplary embodiment, the textual representation shows distinct metadata keywords/phrases or keywords/phrases that are rare in other groups. For example, a "Midsummer in Mölandet" or "Midsummer in Summer cottage" phrases could be an additional characterizations for a June 2005 file group, and they could be created automatically based on e.g. calendar and location information or user-defined keywords that have been attached to some June 2005 files. Based on other metadata, the June 2005 group could have additional characterizations such as "Marion's birthday".

In another exemplary embodiment, textual representations can be static so that all or selected keywords/phases are shown or the presentation can be made. In one embodiment, if there is not enough room in the graphical display to display all of the selected keywords/phases, the additional text can be shown, e.g., using automatically scrolling text or by presenting texts sequentially. Keyword/phrase presentation order can depend on, e.g., the rareness of selected texts compared to other groups and/or favoriteness and newness of the associated files. In another embodiment, keywords/phase selection and/or presentation order can be made context-aware in the same way as what was described above for the file selection. In another embodiment, textual presentation can be synchronized with the thumbnail slideshow presentation so that displayed keywords/phases are related to currently displayed thumbnails. The presented texts can be also selected so that the files are first selected using the above-reference criteria, with the representative metadata for these files then being selected and shown in a synchronized manner. Alternatively, the representative metadata can be selected first, and then the best possible files are selected according to the above-reference criteria for the representative metadata and represented in a synchronous manner. In yet another potential implementation, both the most representative files and the most representative metadata texts are selected, and the corresponding metadata/thumbnails are then shown in a synchronous manner.

Although the above description has been focused on image and video content, one of ordinary skill in the art would appreciate that the above-mentioned techniques could be also utilized with various other content types, for example for music content. In one embodiment, for musical content, pure textual descriptions are used. In another embodiment, visual images associated with the musical content, such as music album covers, are used as a representative image. For music videos, the visual characterization can be composed utilizing the video content. In addition, the present invention contemplates that as the on-line music business becomes more and more popular, it is quite likely that images will be attached to individual songs, and not just to music albums. Music content also can be used with the embodiments described above regarding the use of metadata, as music files typically contains quite rich metadata, such as genre, artist, album, song name, etc., that can be automatically stored and extracted to/from the music files.

In addition, the present invention may be utilized with any suitable device where a hierarchical structure have visual and/or textual representation of node content is useful. In one embodiment, the present invention includes a mobile telephone.

In addition to the above, the present invention may also involve the use of audio representations and characterizations, which can be particularly useful for music and other types of audio recordings. Furthermore, the present invention can also incorporate the use of a text-to-speech presentation of selected textual characterization. In such an arrangement, when scrolling to a particular group of files or content items, the user would see thumbnails and metadata texts, as well as, for example, hear the most relevant locations associated with the content. In this situation, the presented textual and audio metadata could be same or different.

Figure 3:
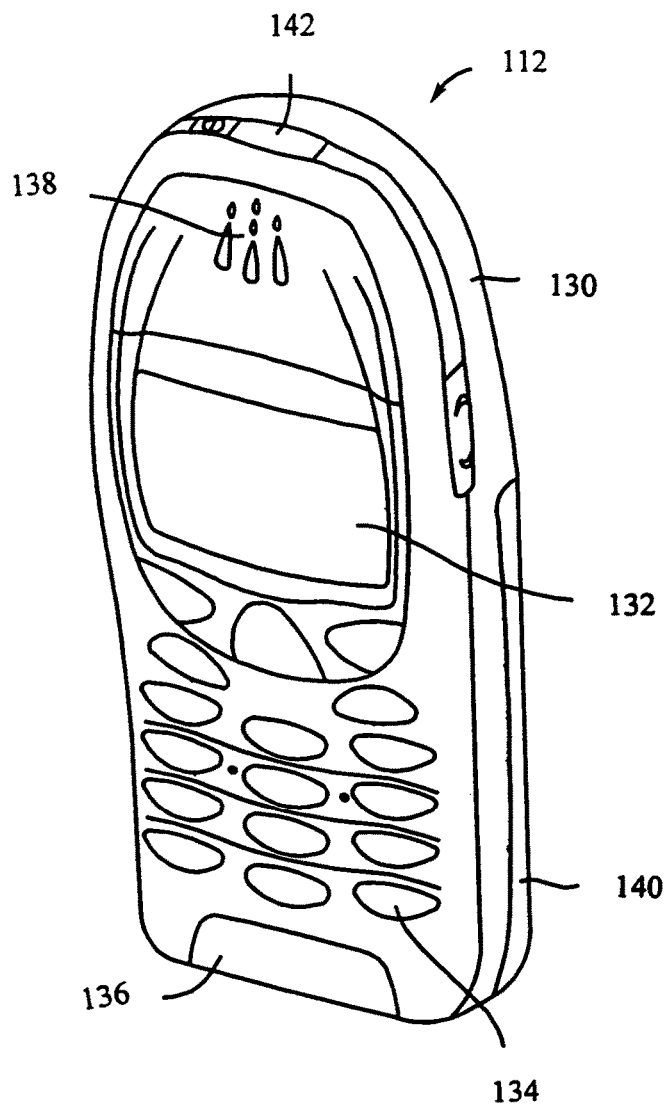
FIG. 3 is a perspective view of a mobile telephone that can be used in the implementation of the present invention.
Figure 4:
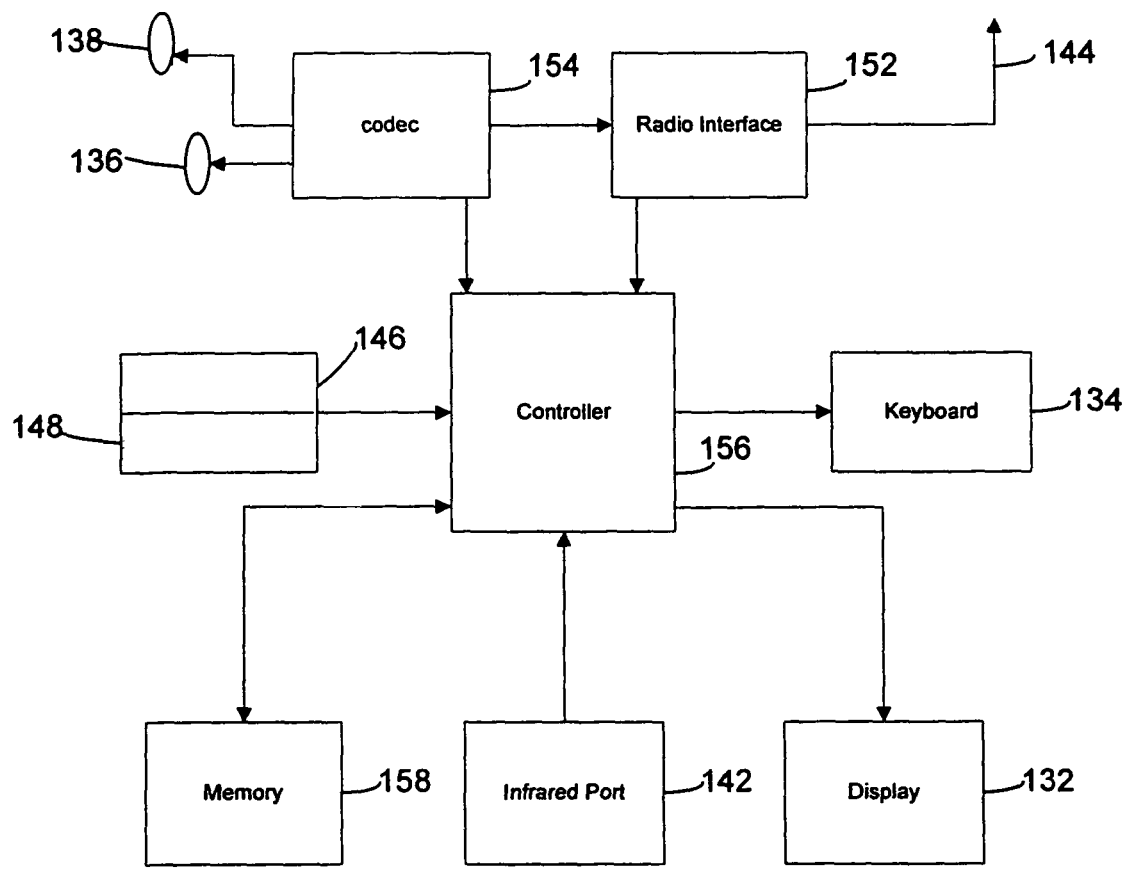
FIG. 4 is a schematic representation of the telephone circuitry of the mobile telephone of FIG. 3.

FIGS. 3 and 4 show one representative mobile telephone 112 within which the present invention may be implemented. It should be understood, however, that the present invention is not intended to be limited to one particular type of mobile telephone 112 or other electronic device. The mobile telephone, 112 of FIG. 3 includes a housing 130, a display 132 in the form of a liquid crystal display (LCD), a keypad 134, a microphone 136, an ear-piece 138, a battery 140, an infrared port 142, an antenna 144, a smart card 146, in the form of a universal integrated circuit card (UICC) according to one embodiment of the invention, a card reader 148, radio interface circuitry 152, codec circuitry 154, a controller 156 and a memory 158. Individual circuits and elements are all of a type well known in the art, for example in the Nokia range of mobile telephones. Other types of electronic devices within which the present invention may be incorporated can include, but are not limited to, personal digital assistants (PDAs), integrated messaging devices (IMDs), portable audio devices, portal image/video device, desktop computers, and notebook computers. FIG. 4 illustrates a schematic of the components of the mobile phone 112 of FIG. 3.

Figure 5:
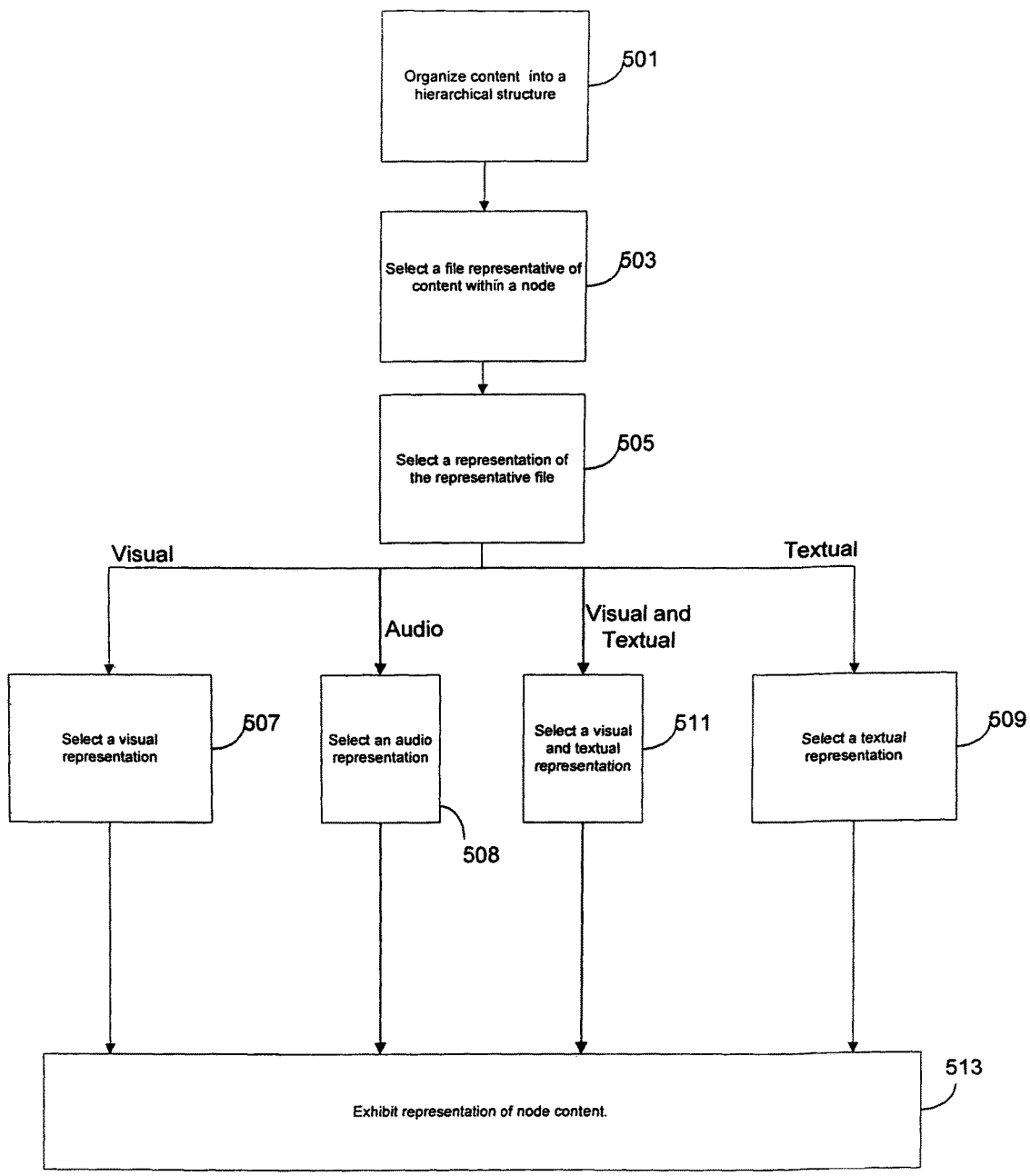
FIG. 5 is a flow diagram showing a generic process for the implementation of the present invention.

FIG. 5 is a flowchart depicting one embodiment of the present invention. The content files, which may be video, audio, images, or any other files capable of be represented, are organized into a hierarchical structure in the organization step, 501. At least one representative file for a selected node is selected at step 503 from the group of files within the node (and in one embodiment, any sub-nodes). At step 505, a type of representation is selected to represent the at least one file selected at step 503. In one embodiment, the type of representation may be audio, visual, textual, or visual and textual. Other combinations of representations are also possible. If a visual type of representation is selected at step 505, then a visual representation of the representative file is selected at step 507. If an audio type of representation is selected at step 505, then a visual representation of the representative file is selected at step 508. If a textual type of representation is selected at step 505, then a textual representation of the at least one representative file is selected at step 509. If a visual and textual type of representation is selected at step 505, then both a textual representation and a visual representation of the at least one representative file is selected at step 511. Regardless of the type of representation chosen in step 505, the representation of the at least one representative file is exhibited at step 513, providing the user with information regarding the content of the node.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method for representing content organized as content items of a same type in a node on a graphical user interface, comprising:
    grouping a plurality of similar content items in the node into at least one cluster, wherein the plurality of similar content items in a particular cluster are identified as having similar content based on at least one of content analysis or technical capturing parameters, and content items in the node but not in the cluster are identified as dissimilar content items based on at least one of content analysis or technical capturing parameters;
    selecting, by a processor, representative content items for each cluster, each representative content item selected from the respective cluster; and
    in an instance, causing display of one representative content item of the at least one cluster, along with one or more thumbnails of dissimilar content items in the node, wherein the similar content items of the same type other than the representative content item of the cluster are not displayed in the instance.

2. The method of claim 1, wherein each representative content item is identified based on an automatic recognition of favorite content items based upon logged actions.

3. The method of claim 1, wherein each representative content item is identified further based on an automatic recognition of favorite content items based upon a manual favoriteness rating.

4. The method of claim 1, wherein a plurality of representative content items are selected, each having at least one characterization resulting in a plurality of characterizations, and wherein the presentation involves the presentation of the plurality of characterizations.

5. The method of claim 4, wherein the presentation of the plurality of characterizations is dynamic.

6. The method of claim 5, wherein each of the plurality of characterizations is presented for a period of time.

7. The method of claim 6, wherein the period of time is shorter for representative content items similar to other representative content items than the period for representative content items that are dissimilar from other representative content items.

8. The method of claim 1, wherein the node is a directory and the content items are files within the directory.

9. The method of claim 1, wherein at least one of the similar content or dissimilar content is identified based on technical capturing parameters.

10. The method of claim 1, wherein each representative content item is further identified based on a number of similar content items to the respective representative content items within the respective cluster according to technical capturing parameters associated with each of the content items in the respective cluster, wherein similarity of the similar content items is determined based on the technical capturing parameters indicating capture via a continuous shooting mode.

11. A computer program product for representing content organized as content items of a same type in a node on a graphical user interface, the computer program product comprising at least one non-transitory computer-readable storage medium having computer-executable program code instructions stored therein, the computer-executable program code instructions comprising program code instructions for:
- grouping a plurality of similar content items in the node into at least one cluster, wherein the plurality of similar content items in a particular cluster are identified as having similar content based on at least one of content analysis or technical capturing parameters, and content items in the node but not in the cluster are identified as dissimilar content items based on at least one of content analysis or technical capturing parameters;
- selecting, by the program code instructions, representative content items for each cluster, each representative content item selected from the respective cluster; and
- in an instance, causing display of one representative content item of the at least one cluster, along with one or more thumbnails of other dissimilar content items in the node, wherein the similar content items of the same type other than the representative content item of the cluster are not displayed in the instance.

12. The computer program product of claim 11, wherein the node is a directory and the content items are files within the directory.

13. The computer program product of claim 11, wherein at least one of the similar content or dissimilar content is identified based on technical capturing parameters.

14. The computer program product of claim 11, wherein each representative content item is further identified based on a number of similar content items to the respective representative content items within the respective cluster according to technical capturing parameters associated with each of the content items in the respective cluster, wherein similarity of the similar content items is determined based on the technical capturing parameters indicating capture via a continuous shooting mode.

15. An apparatus for representing content organized as content items of a same type in a node on a graphical user interface, comprising:
- at least one processor and at least one memory including computer program code, the at least one memory and the computer program code configured to, with the processor, cause the apparatus to at least:
  - group the content items in the node into clusters, wherein at least one representative content item is selected from each cluster;
  - select representations of the representative content items for each respective cluster, the at least one representation selected from the group comprising image representation, video representation, textual representation, audio representation, or combinations thereof, wherein a first representative content item for a respective cluster belongs to a set of similar content items having similar content; and
  - cause display of one representative content item of the similar content items in the node, along with one or more thumbnails of dissimilar content items in the node, wherein the similar content items other than the representative content item of the similar content items are not displayed.

16. The apparatus of claim 15, wherein the node is a directory and the content items are files within the directory.

17. The apparatus of claim 15, wherein each representative content item is further identified based on a number of similar content items to the respective representative content items within the respective cluster according to technical capturing parameters associated with each of the content items in the respective cluster, wherein similarity of the similar content items is determined based on the technical capturing parameters indicating capture via a continuous shooting mode.

* * * * *